(12) United States Patent
Yamaguchi et al.

(10) Patent No.: US 6,275,932 B1
(45) Date of Patent: Aug. 14, 2001

(54) PROGRAM STARTUP APPARATUS AND PROGRAM STARTUP METHOD FOR USE IN ELECTRONIC MACHINE, AND MEDIUM

(75) Inventors: Yoshihiro Yamaguchi, Tokyo; Hidekazu Tanaka, Saitama; Hiroshi Yamaguchi, Tokyo; Masahiko Suzuki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/167,802

(22) Filed: Oct. 7, 1998

(30) Foreign Application Priority Data

Oct. 8, 1997 (JP) .................................... 9-275758
Nov. 19, 1997 (JP) .................................... 9-318341

(51) Int. Cl.[7] ...................................... G06F 9/24
(52) U.S. Cl. .............................. 713/2; 713/502
(58) Field of Search ........................ 713/2, 502

(56) References Cited

U.S. PATENT DOCUMENTS 5,283,845   2/1994   Gross et al. .
5,892,909 * 4/1999   Grasso et al. ................ 709/201
5,925,129 * 7/1999   Combs et al. ................. 713/300
6,047,260 * 4/2000   Levinson ....................... 705/9

FOREIGN PATENT DOCUMENTS 0 604 069   6/1994   (EP) .

* cited by examiner

Primary Examiner—Dennis M. Butler
(74) Attorney, Agent, or Firm—Frommer Lawrence & Haug, LLP.; William S. Frommer; Dexter T. Chang (57) ABSTRACT

A program startup apparatus is used in an electronic machine and automatically starts up a function provided for the electronic machine with a user's single touch operation. The program startup apparatus automatically starts up a predetermined application program stored in the electronic machine. The apparatus has startup condition storage devices for storing a startup condition preset by the user. The apparatus also has a startup sequence control device for starting up the predetermined application program upon determining that the status of the electronic machine matches the startup condition stored in the startup condition storage devices.

17 Claims, 10 Drawing Sheets

PROGRAM STARTUP APPARATUS AND PROGRAM STARTUP METHOD FOR USE IN ELECTRONIC MACHINE, AND MEDIUM

BACKGROUND OF THE INVENTION

1. Field of the Invention

The present invention relates to a program startup apparatus for use in an electronic machine, such as a portable computer, which automatically starts up functions provided for the electronic machine by a user's single touch operation. The invention also relates to a program startup method and a medium, both of which are used in the above type of program startup apparatus.

2. Description of the Related Art

Many types of portable electronic machines have been developed, and above all, high-end portable electronic machines loaded with a central processing unit (CPU) are now available. The portable electronic machines, for example, a portable computer, have a main unit and a display unit, such as a liquid crystal display unit (LCD). The display unit is opened from and closed to the main unit via hinges. Typical examples of such portable computers are notebook-type personal computers.

In some electronic machines, an application program for sending and receiving mail, which is referred to as "electronic mail" (e-mail), via, for example, communication lines is installed. In this case, in order to check whether there is any e-mail addressed to the user or to observe the content of incoming mail, the user is required to perform predetermined operation steps, such as running a basic program, which is referred to as an operating system (OS), of the electronic machine, starting up an e-mail application program, and booting up a function for checking e-mail addressed to the user.

It is demanded that the user promptly check e-mail in an electronic machine. It is also demanded that the user instantly start up not only the e-mail function, but also other functions provided for the electronic machine.

SUMMARY OF THE INVENTION

Accordingly, in order to overcome the above-described drawbacks, it is an object of the present invention to provide a program startup apparatus for use in an electronic machine, which is capable of automatically starting up functions provided for the electronic machine by a user's single touch operation, and also to provide a program startup method and a medium, both of which are used in the above type of apparatus.

In order to achieve the above object, according to one aspect of the present invention, there is provided a program startup apparatus for use in an electronic machine and for automatically starting up a predetermined application program stored in the electronic machine. The program startup apparatus includes startup condition storage means for storing a startup condition preset by a user. Startup sequence control means start up the predetermined application program upon determining that a status of the electronic machine matches the startup condition stored in the startup condition storage means.

According to another aspect of the present invention, there is provided a program startup method for use in an electronic machine and for automatically starting up a predetermined application program stored in the electronic machine. The program startup method includes a startup condition storage step of storing a startup condition preset by a user, and a startup sequence processing step of starting up the predetermined application program upon determining that a status of the electronic machine matches the startup condition stored in the startup condition storage step.

According to a further aspect of the present invention, there is provided a medium for storing a program startup program executable in an electronic machine and implementing a program startup method for automatically starting up a predetermined application program stored in the electronic machine. The program startup method includes a startup condition storage step of storing a startup condition preset by a user, and a startup sequence processing step of starting up the predetermined application program upon determining that a status of the electronic machine matches the startup condition stored in the startup condition storage step.

With the above arrangement, in automatically starting up a predetermined application program stored in an electronic machine, a startup condition preset by the user is stored in the startup condition storage means. The startup sequence control means starts up the predetermined application program when it determines that the status of the electronic machine matches the startup condition stored in the startup condition storage means. This enables the user to immediately start up a predetermined application program.

According to the present invention, the startup sequence control means, upon determining that the operation means is operated in a state in which a basic program for controlling said electronic machine is not running, may start up the basic program, and then may start up the predetermined application program and further starts up a predetermined function of the predetermined application program.

The predetermined application program may include an electronic mail program for sending and receiving mail via a network, and the predetermined function may include an incoming mail retrieving function of retrieving mail addressed to the user.

The program startup apparatus may further include reporting means for reporting that the mail addressed to the user has been retrieved by using the incoming mail retrieving function of the electronic mail program.

DESCRIPTION OF THE PREFERRED EMBODIMENT

A preferred embodiment of the present invention is described hereinafter in detail with reference to the accompanying drawings. The embodiment described below is provided with various technical restrictions since it is only a specific example of the preferred embodiments of the present invention. However, the scope of the invention is not limited to the embodiment unless otherwise stated in the following description.

Figure 1:
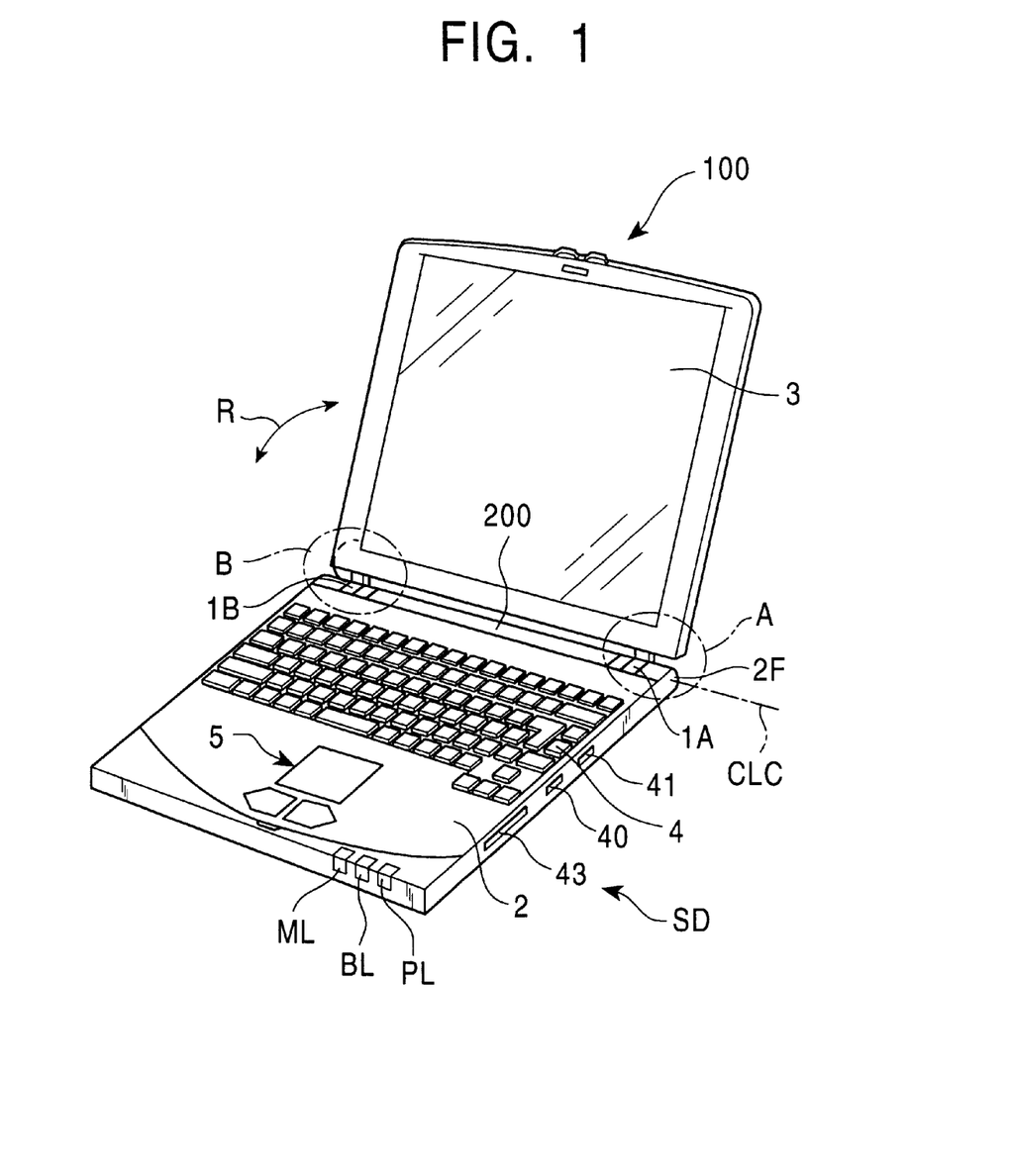
FIG. 1 is a perspective view illustrating a portable computer as an example of an electronic machine provided with a program startup apparatus of the present invention.

FIG. 1 illustrates an example of an electronic machine provided with a program startup apparatus 1000 (FIG. 4) according to the present invention. In FIG. 1, a portable computer 100 is used as the electronic machine. The portable computer 100 includes a main unit 2, a display unit 3, a keyboard 4, hinges 1A and 1B indicated by regions A and B, respectively, a battery pack (battery) 200, and so on.

The main unit 2 has the above-described keyboard 4, a pointing device 5, etc. As the display unit 3, a liquid crystal display unit (LCD) may be used. The display unit 3 is attached to the main unit 2 via the hinges 1A and 1B so that it can be opened from and closed to (foldable) the main unit 2 in the directions indicated by the arrows R. A function for attaching an external mouse, which serves as an external pointing device, may be set in the main unit 2, though it is not shown in FIG. 1. The main unit 2 has a power lamp PL, a battery lamp BL, and a message lamp (reporting means) ML, the battery lamp BL indicating the remaining amount of the battery pack 200. The above-mentioned lamps, in particular, the message lamp ML, are exposed even though the display unit 3 is closed to the main unit 2. It is thus possible to inform the user by switching on the message lamp ML when e-mail has been received.

Figure 2:
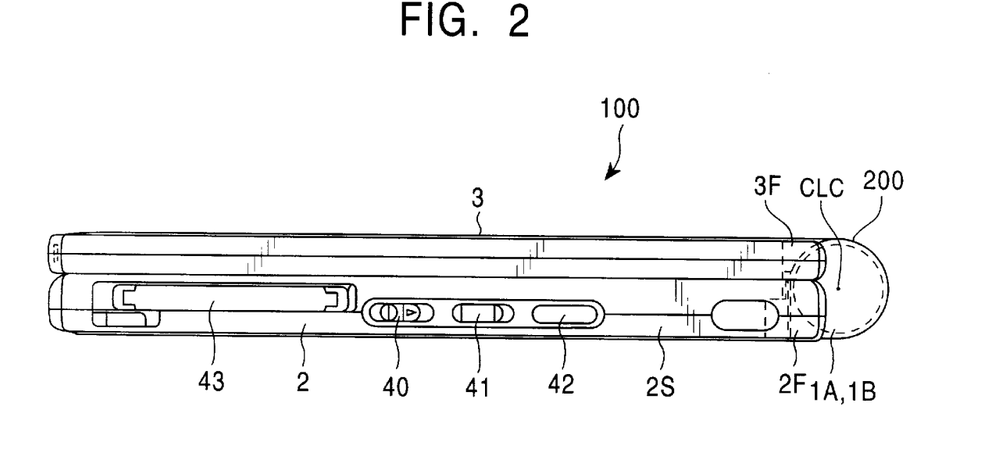
FIG. 2 is a side view of the computer shown in FIG. 1 as viewed from the arrow SD.

FIG. 2 illustrates the display unit 3 of the electronic machine shown in FIG. 1 when it is folded onto the main unit 2 with respect to the center axis CLC, as viewed in the direction indicated by the arrow SD. In FIG. 2, a power switch 40, an operation key 41, a switch 42, etc. are disposed on a side face 2S of the main unit 2. Also provided on the side face 2S is a slot 43 for receiving a Personal Computer Memory Card International Association (PCMCIA) card (PC card). The operation key 41 functions in a manner different from the power switch 40. The operation key 41 is a switch for booting up startup sequence control means 2A illustrated in FIG. 4, while the power switch 40 is a switch for executing the basic program (OS).

Figure 3:
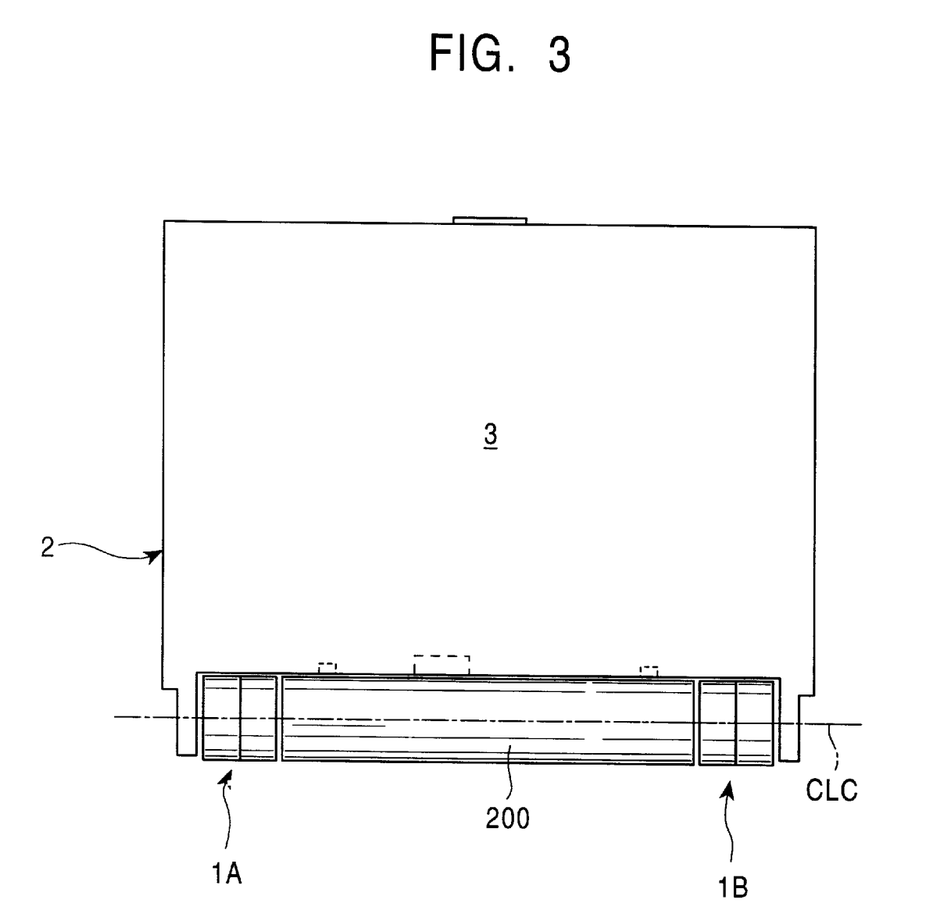
FIG. 3 is a plan view illustrating the computer shown in FIGS. 1 and 2.

The battery pack 200 is disposed, as shown in FIGS. 1 through 3, between the hinge 1A and the hinge 1B. Preferably, the center axis CLC equivalent to the center axis of the hinges 1A and 1B matches the center axis of the battery pack 200. Namely, the center axis of the battery pack 200 coincides with the center axis of the hinges 1A and 1B. The battery pack 200 is mechanically held by and electrically connected to the main unit 2 in such a manner that it is detachable from the main unit 2.

Figure 4:
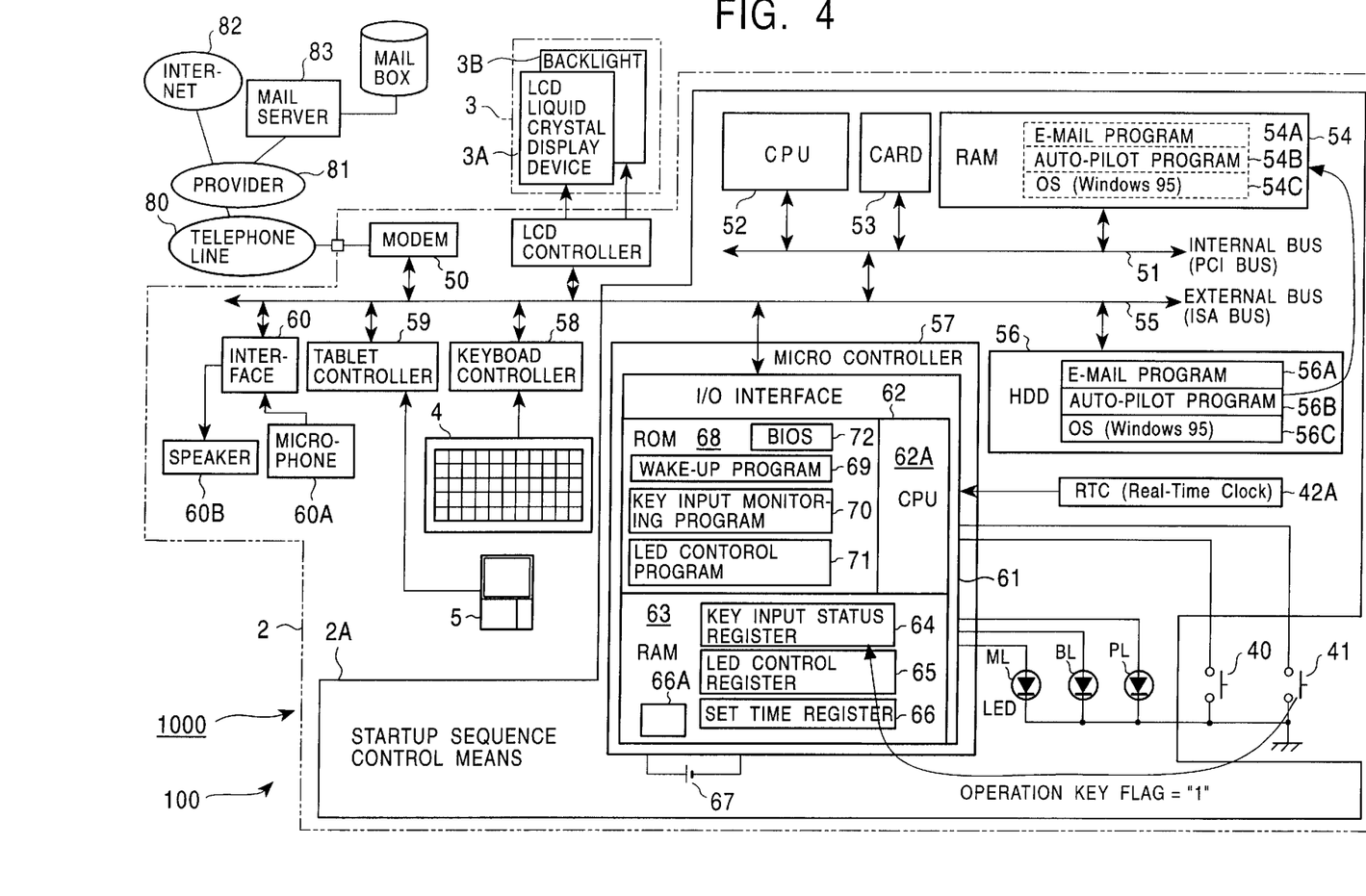
FIG. 4 illustrates a system configuration of a main unit, a display unit, and other elements of the computer shown in FIGS. 1 through 3.

FIG. 4 illustrates the program startup apparatus 1000 for use in the portable computer 100 shown in FIGS. 1 through 3 and also illustrates machines externally attached to the portable computer 100. More specifically, FIG. 4 illustrates the main unit 2, the display unit 3, and a modem 50 integrated into the main unit 2.

The program startup apparatus 1000 contained in the main unit 2 has the operation key (operation means) 41, the power switch 40, and the startup sequence control means 2A, and is configured as follows.

Connected to an internal bus 51 of the startup sequence control means 2A are a CPU 52, a PC card 53 inserted into the main unit 2 as required, and a random access memory (RAM) 54. The internal bus 51 is connected to an external bus 55. Connected to the external bus 55 are a hard disk drive 56, an input/output controller (I/O controller) 57, a keyboard controller 58, a tablet controller 59, an interface 60, and so on.

The CPU 52 controls the entire operations of the individual functions. The PC card 53 is used for adding optional functions to the internal bus 51.

An e-mail program (application program) 54A, an auto-pilot program (application program) 54B, and an OS (basic program) 54C are stored in the random access memory 54 upon completing the running operation of the main unit 2.

The e-mail program 54A is a program that sends and receives mail via a network through communication lines, such as telephone lines. The e-mail program 54A has a specific function of retrieving incoming mail. According to the incoming mail retrieving function, a check is made as to whether there is any mail addressed to the user within a mail box possessed by a mail server 83 shown in FIG. 4, and mail addressed to the user is retrieved.

The auto-pilot program 54B is a program that sequentially starts up and processes a plurality of preset operations (or programs) in a preset order.

The OS (basic program software) 54C controls an electronic machine, i.e., the portable computer 100. As the OS 54C, an operating system, such as Windows 95, may be used which is one type of operating system for personal computers and has been developed by Microsoft Corporation in the United States.

Stored in the hard disk drive (HDD) 56 in the vicinity of the external bus 55 are an e-mail program 56A, an auto-pilot program 56B, and an OS (basic program software) 56C. The OS 56C, the auto-pilot program 56B, and the e-mail program 56A are sequentially stored in the RAM 54 in the process of starting (booting-up) the main unit 2.

The I/O controller 57 includes a micro controller 61, which is provided with an I/O interface 62. The I/O interface 62, a CPU 62A, a random access memory (RAM) 63, and a read only memory (ROM) 68 are interconnected to each other, thereby forming the micro controller 61. The RAM 63 includes a key input status register 64, a light emitting diode (LED) control register 65, a set time register 66, and an operation key/program correlating register 66A. The set time register 66, which serves as start-up condition storage means, in which the user sets the time (start-up condition) in advance, and the operation of the start-up sequence control means 2A is started when the preset time has been reached. The operation key/program correlating register 66A stores the correlation between a preset combination of operation keys (start-up conditions) and application programs to run. When a preset combination of operation keys is pressed by the user, the corresponding application program (for example, the e-mail application) can be started.

An operation key flag is stored in the key input status register 64 upon pressing the operation key 41, which serves as single touch operation switch means, which will be described later. The LED control register 65 controls the on/off of the message lamp (reporting means: using an LED, for example) ML indicating the instantaneous startup status of the e-mail application. The set time register 66 is used for setting a desired time.

The micro controller 61 is provided with a backup battery 67 so that the values stored in the registers 64, 65 and 66 can be retained even if the main unit 2 is powered off.

Stored in the ROM 68 within the micro controller 61 in advance are a wake-up program 69, a key input monitoring program 70, and an LED control program 71. The ROM 68 is formed of, for example, an electrically erasable and programmable read only memory (EEPROM). The EEPROM is also referred to as a "flash memory". A Real-Time Clock (RTC) 42A for constantly counting the current time is also connected to the micro controller 61.

The wake-up program 69 within the ROM 68 is a program that checks whether the time set in the set time register 66 has been reached based on the current time data supplied from the RTC 42A, and executes predetermined processing (or a program) if the preset time has been reached. The key input monitoring program 70 is a program that constantly monitors whether the operation key 41 has been pressed by the user. The LED control program 71 is a program that controls the on/off of the message lamp ML.

A Basic Input/Output System (BIOS) 72 is also written into the ROM 68. The BIOS is a software program that controls delivery (input/output) of data between the OS or application software and peripheral devices (a display, a keyboard, a hard disk drive, etc.)

The keyboard controller 58 connected to the external bus 55 shown in FIG. 4 controls the input operation of the keyboard 4. The tablet controller 59 controls the input operation of the tablet 5 shown in FIG. 1. As the tablet, a pressure sensing type may be used.

Sound from an internal microphone 60A is received and a sound signal is supplied to a built-in speaker 60B through the interface 60.

The modem 50 is connectable to a communication network 82, such as the Internet, and a mail server 83 via a public telephone line 80 and an Internet service provider 81.

Figure 7:
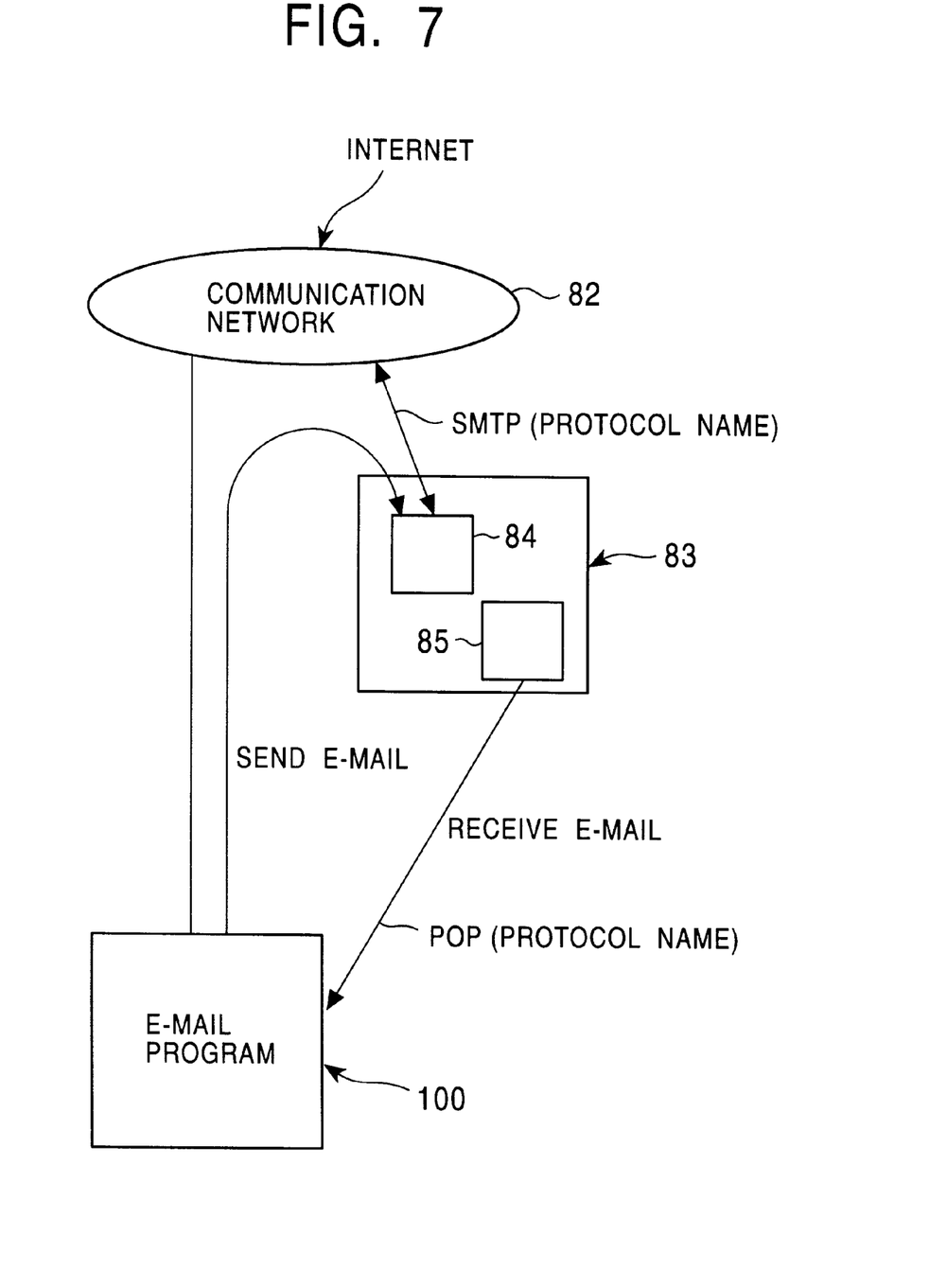
FIG. 7 illustrates an example of the relationship between a computer and a communication network.

FIG. 7 illustrates an example of mail transfer between the communication network 82 or the mail server 83 and the portable computer 100. An e-mail program is installed in the portable computer 100, which serves as a client computer, so that the user is able to send e-mail to the mail server 83 from the computer 100 via the communication network 82.

The mail server 83 has a Simple Mail Transfer Protocol (SMTP) server 84 and a Post Office Protocol (POP) server 85. The SMTP server 84, which is an Internet standard message transfer protocol, transfers messages between the mail server 83 and the communication network 82. The POP server 85 is a protocol used for transferring e-mail to the client computer 100.

A brief description is given below with reference to FIGS. 5 and 4, of the process of booting up an e-mail function, which is one of the functions provided for the computer 100, and checking for the presence or absence of e-mail or observing the content of e-mail.

1. Starting up Favorite Software with Single Touch Operation

By using "PPK Setup" software, a favorite software program or a script file can be run merely by pressing the programmable power key (the operation key 41). Since a favorite software program can be executed by a single touch operation, it is convenient to assign software programs which are preferably executed promptly. The process of selecting initially preset software programs is given below.

Figure 8:
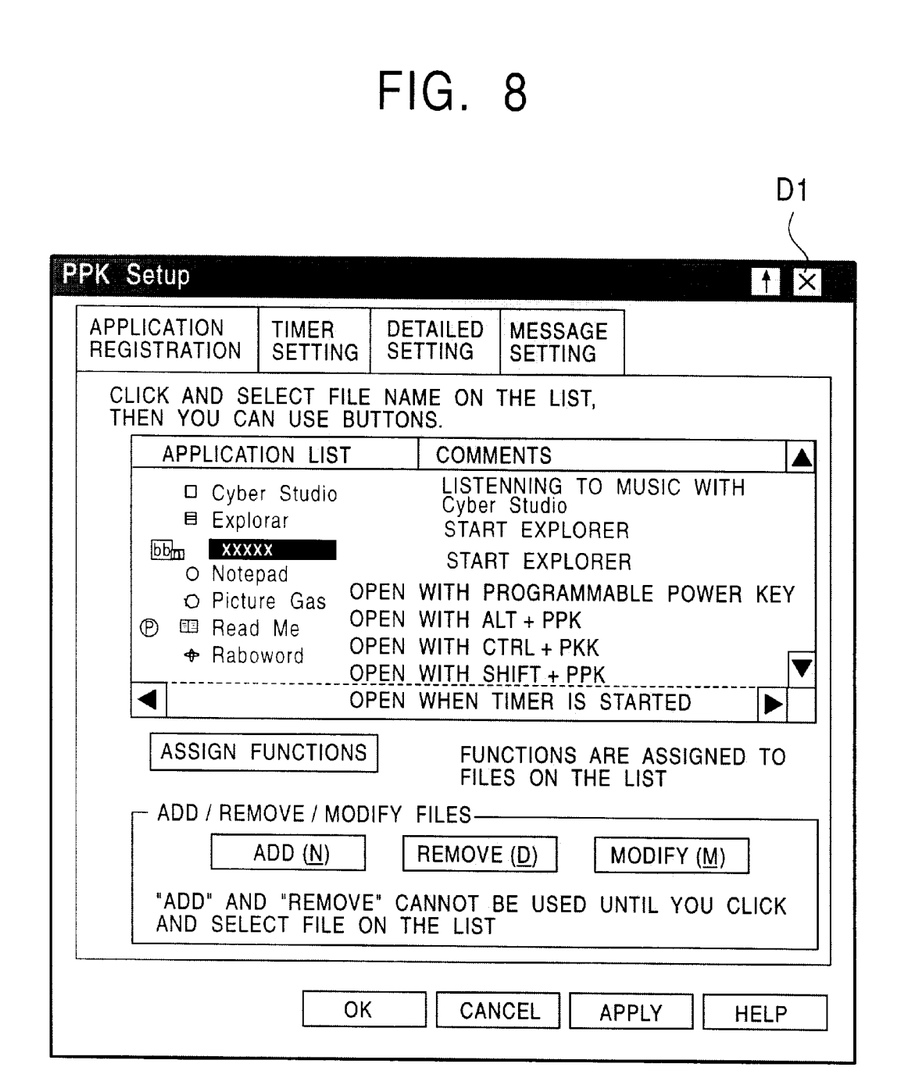
FIG. 8 illustrates an example of a "PPK Setup" dialog box D1 shown on the display unit.

(Step 1) Double-click on "PPK setup icon" of a predetermined shape indicated on the task bar of the startup screen of Windows 95 to display a "PPK Setup" dialog box D1 shown in FIG. 8.

(Step 2) Select a favorite software program from "Application List" and click the right button of the touch pad. "Setup Menu" shown in FIG. 8 is indicated.

(Step 3) Click on "Open with Programmable Power Key" to display a set icon of a predetermined shape on the software program selected in step 2.

(Step 4) Click "OK" to complete the setting. Press the programmable power key on the right face of the computer to start the set software program.

If it is desired that a software program which is not contained in "Application List" is specified, "Add" is clicked to designate a favorite software program.

With the initial setting, if the programmable power key is pressed in the state in which the liquid crystal display panel is closed, the designated software program is not started. If it is desired that a software program is executable even when the liquid crystal display panel is closed, click the tab of "detailed Settings" of "PPK Setup" and turn off the checkbox of "Unusable when the Liquid Crystal Panel is Closed".
Combination of Programmable Power Key (Operation Key 41) and Other Keys A favorite software program may be started by pressing a combination of the programmable power key and another key. Namely, if the combination of the keys pressed by the user matches the startup condition preset by the user, i.e., the condition assigned to the operation means (operation key), the corresponding software program can be started.

A combination of keys is selected with "Setup Menu" shown in FIG. 8 indicated in (Step 2).

① "Open with Programmable Power Key"

A favorite software program is opened merely by pressing the programmable power key (operation key 41) on the right face of the computer. Even if the computer is not powered on, it is automatically switched on upon pressing the programmable power key, thereby starting a favorite software program.

② "Open with ALT+PPK"

A favorite software program is opened if the programmable power key is pressed while holding down the Alt key when the computer is turned on.

③ "Open with CTRL+PPK"

A favorite software program is opened if the programmable power key is pressed while holding down the Ctrl key when the computer is turned on.

④ "Open with SHIFT+PPK"

A favorite software program is opened if the programmable power key is pressed while holding down the shift key when the computer is turned on.

The above-described relationships between the operation keys preset by the user and the application programs to be run are stored in operation key/program correlating register 66A provided for the RAM 63 within the micro controller 61.

2. Starting up Favorite Software Program with Built-in Timer

By using a built-in timer, a favorite software program can be started at a desired time when the computer is in ① the normal running state, ② the standby mode, or ③ the suspend mode. A script file may be executed at a desired time in a manner similar to software programs assigned to the programmable power key.

Operating Mode of the Above-described Computer

① Normal Mode (Steady Power Lamp)

This mode is a normal operating mode, however, specific devices, such as the liquid crystal display unit or the modem, may be switched off to save power.

② Standby Mode (Blinking Power Lamp)

The operation of the entire system is temporarily suspended, which is convenient when the user leaves the computer for a short period of time.

To place the computer in the standby mode, press the S key while holding down the Fn key.

To restore the computer to the normal mode, press any key. An external mouse or a keyboard may be pressed.

③ Suspend Mode (Slowly Blinking Power Lamp)

Power off the CPU while retaining the currently operating status, which is convenient to restart the operation the next day.

To enter the computer in the suspend mode, press the Esc key while holding down the Fn key.

To restore the computer to the normal mode, press any key on the keyboard of the main unit.

(Step 1) Double-click on "PPK setup icon" on the task bar of the startup screen of Windows 95 to display "PPK Setup".

(Step 2) Select a software program to be started by using the timer from "Application List" and click the right button of the touch pad.

(Step 3) Click on "Run when the Timer is On" to display "Timer set icon" of a predetermined shape on the software program selected in step 2.

(Step 4) Double-click on the "Timer Setting" tab.

(Step 5) Click on the "Timer Setting".

Figure 9:
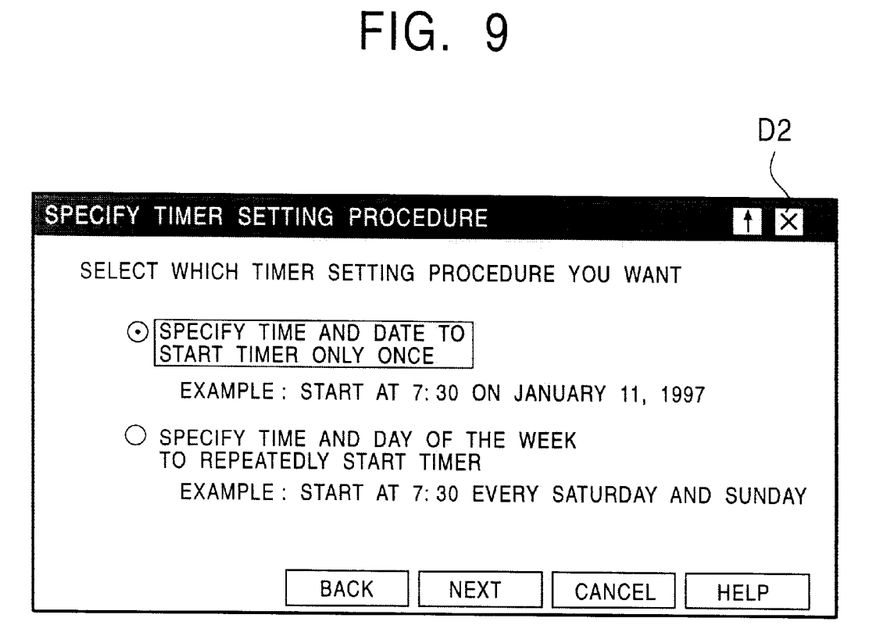
FIG. 9 illustrates an example of a "Designate Timer Setup Procedure" dialog box D2 shown on the display unit.

A "Specify Timer Setting Procedure" dialog box D2 shown in FIG. 9 is displayed.

"Specify Time and Date to Start Timer Only Once" is selected to start the timer at the designated time and date. "Specify Time and Day of the Week to Repeatedly Start Timer" is selected to start the timer at a predetermined time of a predetermined day of the week.

(Step 6) Click on "Next>" to set the timer start time. If "Specify Time and Date to Start Timer Only Once" is selected in step 5, the time and the date are set. If "Specify Time and Day of the Week to Repeatedly Start Timer" is selected in step 5, the time and the day of the week are set.

(Step 7) Click on "Next>".

(Step 8) Click on "End". Then, the settings are completed.

After the software program is automatically run, the computer may enter the power saving operation mode after a predetermined lapse of time. Click on "Shift to Power Saving Mode after Timer is Started" in step 7 to set the time taken to interrupt the processing.

The above-described startup date and time preset by the user are stored in the set time register 66 provided for the RAM 63 within the micro controller 61.

3. Checking E-mail with Single Touch Operation

As an example of handy use of the programmable power key, e-mail can be checked with a single touch operation. The programmable power key can be simply pressed to check e-mail.

The following points are required to be checked before using this function of the key.

Whether the user has made a contract with an Internet provider to establish a connection with the Internet;

Whether the user has retrieved an e-mail account;

Whether the user has established "Dial-up Network Setting" of Windows 95;

Whether "Save Password" has been turned on the checkbox in "Dial-up Network Setting"; and Whether the user has set up an e-mail software program.

(Step 1) Double-click on the "PPK setup icon" on the task bar of the startup screen of Windows 95 to display "PPK Setup".

(Step 2) Click "Add" to display "Select Setting Procedure".

(Step 3) Click on "Simple Setting" and click on "Next>.

Figure 10:
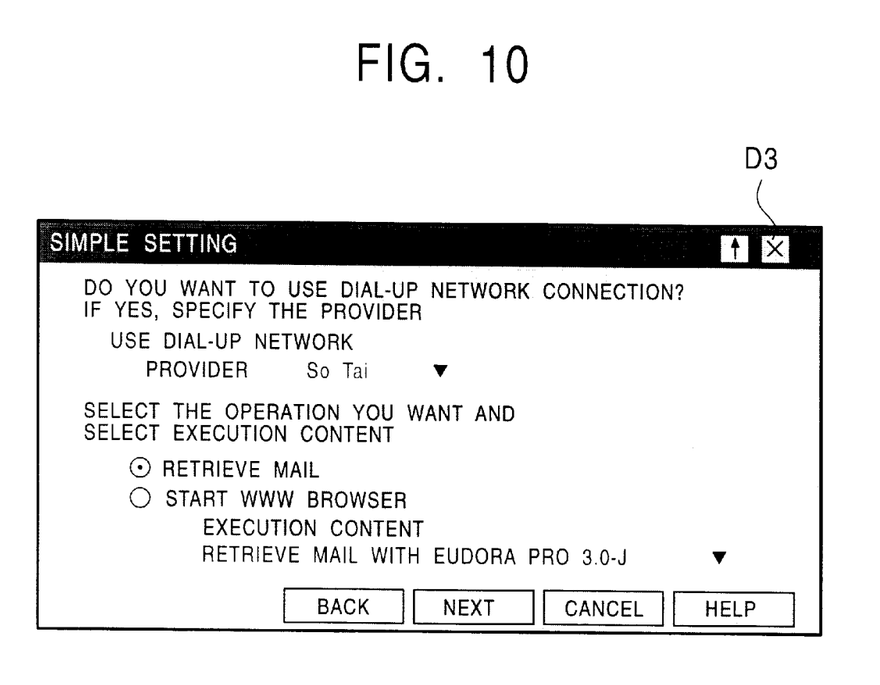
FIG. 10 illustrates an example of a "Simple Setting" dialog box D3 shown on the display unit.

The "Simple Setting" dialog box D3 shown in FIG. 10 is then shown, and the setting is performed as follows.

① Click on "Dial-up Network Connection" to set the dial-up provider to be connected. Click the down arrow key to select the dial-up provider which has been set in "Internet Connection Wizard" or the like.

② Click on "Receiving Mail" as shown in FIG. 10 to set the execution content.

Click the down arrow key to select the e-mail software program to be used.

(Step 4) Click on "Next>" to input a file name or a comment. The file name or the comment is displayed on the "PPK Setup" screen.

(Step 5) Click on "end".

(Step 6) Select the file name set in step 4 from "Application List" and click it with the right button.

(Step 7) Perform steps 3 and 4 of "Starting up Favorite Software with Single Touch Operation". The settings are then completed. The programmable power key is pressed to start the designated e-mail software program to automatically receive e-mail.

Figure 5:
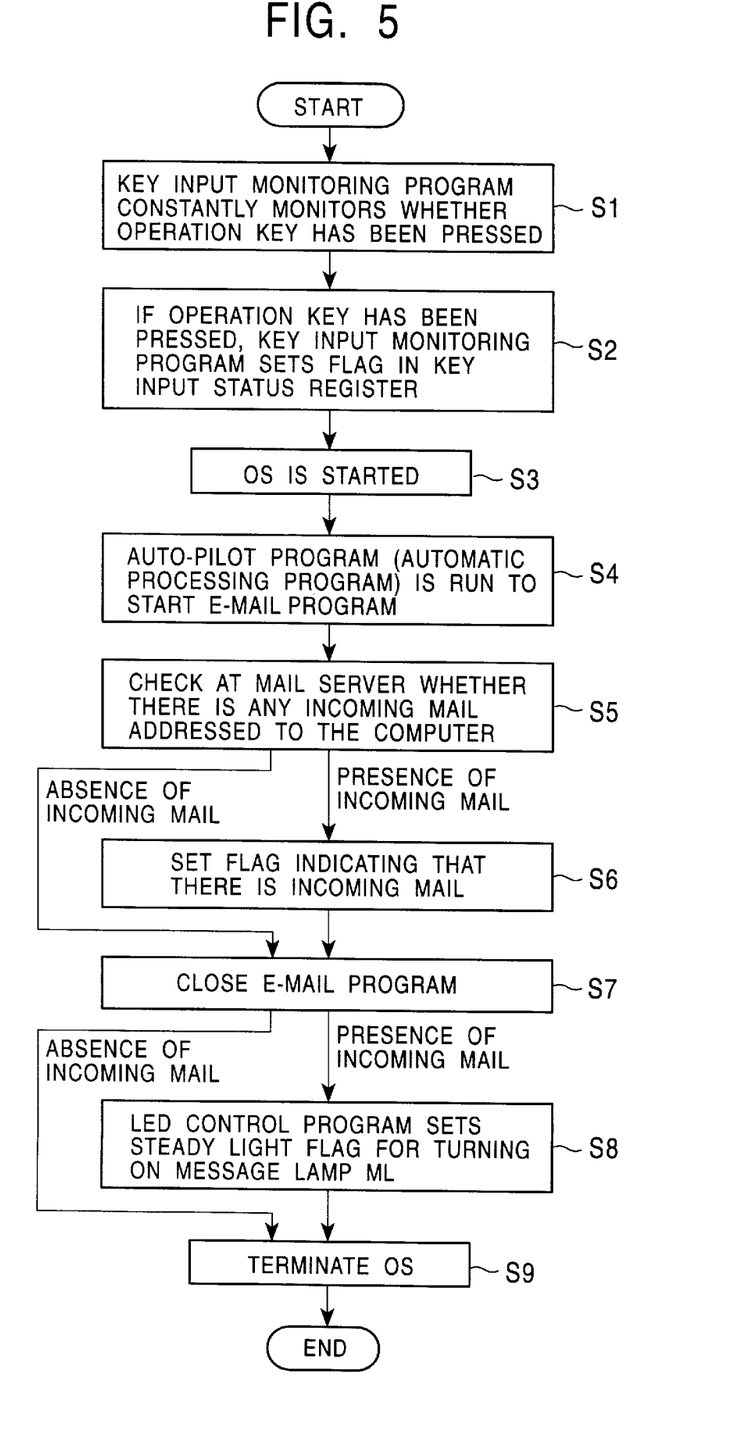
FIG. 5 illustrates a process of starting up the function for use in the present invention.

A reference is now made to the flow chart of FIG. 5. In step S1, the key input monitoring program 70 shown in FIG. 4 constantly monitors whether the operation key 41 shown in FIGS. 1 and 4 has been pressed by the user. If it is found in step S2 that the operation key 41 has been pressed, the key input monitoring program 70 sets a flag in the key input status register 64 to instruct it to write "1" into the operation key flag.

In steps S3 and S4, the OS 56C of the hard disk drive 56 is stored in the RAM 54 and is started (boots up). In step S4, the auto-pilot program (automatic sequence processing program) 56B is run to start the e-mail program 56A. Then, the OS 54C, the auto-pilot program 54B, and the e-mail program 54A are sequentially stored in the RAM 54, thereby completing the start-up operation.

In step S5, the CPU 52 checks at the mail server 83 illustrated in FIGS. 4 and 7 whether there is any incoming mail addressed to the computer. If there is any incoming mail, the process proceeds to step S6 in which a flag is set to indicate that there is incoming mail. In step S7, the e-mail program is then closed. In case of the presence of incoming mail, the LED control program 71 illustrated in FIG. 4 writes a steady light flag (sets a steady light flag) into the LED control register 65, thereby turning on the message lamp ML in step S8. The OS 54C is then terminated in step S9.

If it is found in step S5 that there is no incoming mail, the process proceeds to step S7 in which the e-mail program is closed. The process further proceeds to step S9 in which the OS 54C is then terminated.

The operation performed by the I/O controller 57 and the processing executed by the CPU 52 are described in detail below with reference to FIG. 6.

Figure 6:
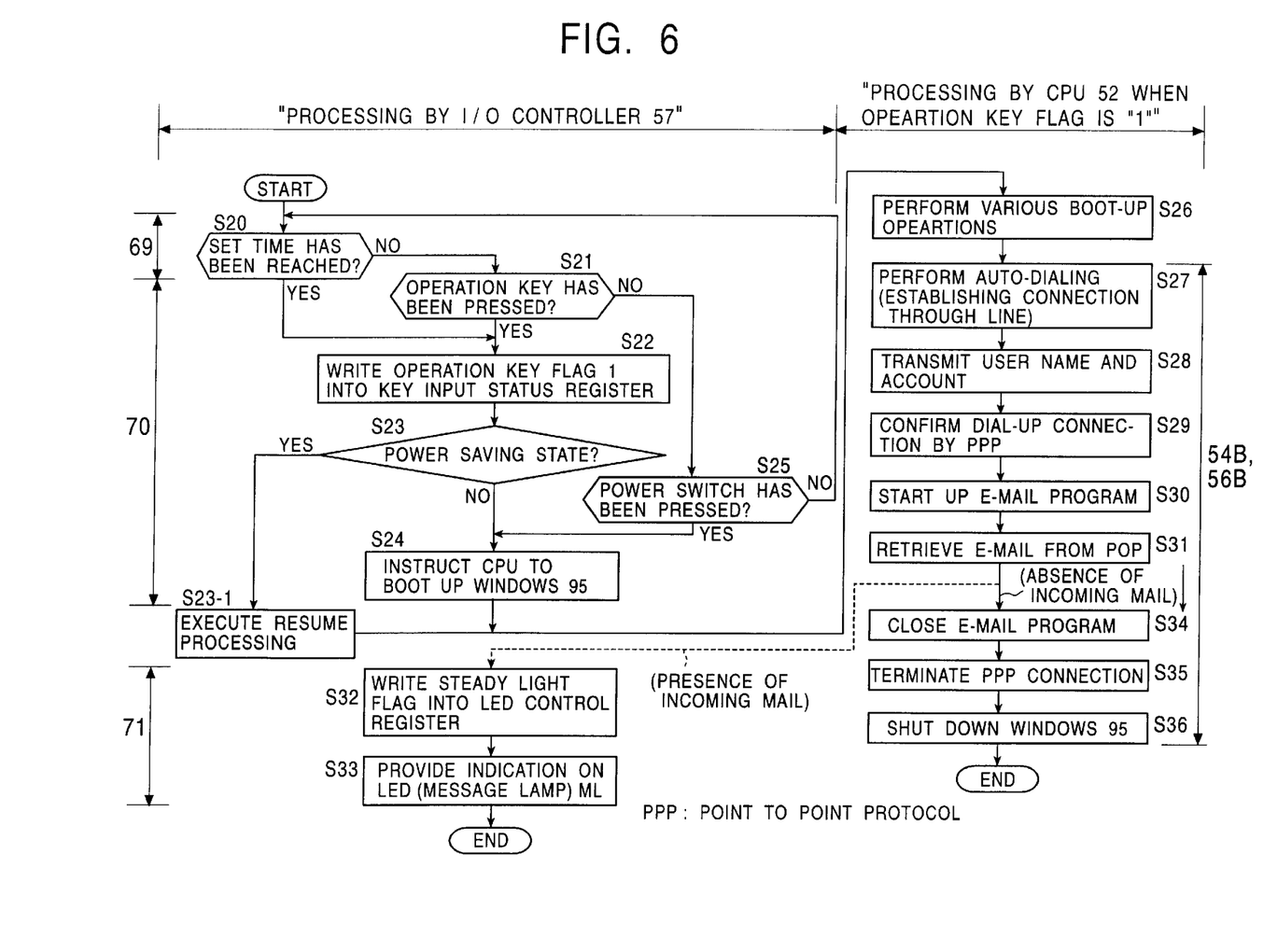
FIG. 6 illustrates a more detailed process of starting up the function for use in the present invention.

In FIG. 6, step S20 is performed by the wake-up program 69, and steps S21, S22, S23, S24, and S25 are performed by the key input monitoring program 70. Steps S32 and S33 are executed by the LED control program 71, and steps S27 through S36 are executed by the auto-pilot programs 56B and 54B.

Processing in steps S20, S21, S22, S23, S24, S25, S32 and S33 is executed upon instruction of the I/O controller 57, and processing in steps S26 through S36 is executed upon instruction of the CPU 52.

In step S20, the CPU 52 shown in FIG. 4 first determines in accordance with the wake-up program 69 whether the time set in the set time register 66 has been reached. If the set time has been reached, the CPU 52 starts the operation of the startup sequence control means 2A, and the process proceeds to step S22.

On the other hand, if the set time has not been reached in step S20 and if the operation key 41 has been pressed by the user in step S21, the process proceeds to step S22. If it is found in step S21 that the operation key 41 has not been pressed, the process proceeds to step S25.

In step S22, "operation key flag" is set to be "1" and is stored in the key input status register 64. The I/O controller 57 then determines in step S23 whether the computer is in the power saving state. More specifically, if the CPU 52 illustrated in FIG. 4 is maintained in the power saving mode, the process proceeds to step S23-1 in which resume processing is executed. In contrast, if it is found in step S23 that the computer is not in the power saving mode, the I/O controller 57 instructs the CPU 52 to boot up (start) the OS 56C (Windows 95) in step S24.

If the operation key 41 has been pressed by the user in step S21 and if the power switch (key) 40 has been pressed in step S25, the I/O controller 57 makes an instruction similar to the above-described instruction in step S24.

Upon shifting the process from step S24 or S23-1 to step S26, the CPU 52 starts to execute the corresponding processing. Since the operation key flag "1" has been issued, the OS 54C (Windows 95) boots up or resume processing is executed, or the auto-pilot program 54B boots up in step S26. The "boot-up" means the startup operation or the running operation.

In step S27, the CPU 52 makes an instruction to perform auto-dialing to connect to the access point of the Internet service provider 81 preset by the user via the modem 50 and the telephone line 80 illustrated in FIG. 4, thereby establishing a connection with the provider 81 through the line.

In step S28, the user name (user ID) and an account, such as a password, are transmitted with a timing instructed by the provider 81. If the CPU 52 confirms the dial-up connection by using point-to-point protocol (PPP) in step S29, the e-mail program 54A shown in FIG. 4 is started in step S30 to retrieve e-mail from the mail server 83 to the client computer 100, as illustrated in FIG. 7. If there is any incoming mail addressed to the user in step S31, the process proceeds to step S32 in which the LED control program 71 writes the steady light flag into the LED control register 65 to light up the message lamp ML shown in FIG. 4.

Conversely, if it is found in step S31 that there is no incoming mail addressed to the user, the e-mail program 54A is closed in step S34, and the PPP connection with the provider 81 is terminated in step S35. In step S36, the OS (Windows 95) 54C then shuts down.

In this manner, the startup sequence control means 2A constantly monitors whether the operation key 41 has been pressed by the user. This enables the user to automatically retrieve e-mail merely by pressing the operation key. Namely, the user simply presses the operation key 41 with a single touch operation, thereby enabling the startup sequence control means 2A shown in FIG. 4 to automatically boot up the incoming e-mail retrieving function.

In the embodiment of the present invention, processing in steps S20 through S25 and steps S32 and S33 of FIG. 6 is stored in the ROM 68 of the I/O controller 57 illustrated in FIG. 4, and processing in steps S26 through S36 of FIG. 6 is stored in the HDD 56.

However, the present invention is not restricted to the above example, and the steps shown in FIG. 6 may be stored in a single ROM such as the ROM 68.

Apart from the aforementioned function of checking for the presence or the absence of e-mail, an electronic machine, such as the portable computer 100, may include the following functions.

Applications Where Operation Key May be Used (1) BGM Startup Utility

After the computer is powered on to start Windows 95 by pressing the operation key, an audio player application is immediately run to sequentially and randomly reproduce Musical Instruments Digital Interface (MIDI) files for a few to a few thousands tracks stored in the HDD, thereby automatically playing back background music (BGM). The MIDI is an interface through which a synthesizer, a sequencer, a rhythm sound source, sequence software, and an operating computer transmit and receive music data.

(2) Handwriting Notepad Startup Utility

After the computer is powered on to start Windows 95 by pressing the operation key, the touch pad as the pointing device is immediately set in the absolute coordinate detection mode. Then, a drawing software application is run so that the handwriting notepad is ready for use (which is convenient to write down telephone numbers/addresses when the user is on the telephone).

(3) Camera Startup Utility (In a system provided with an image photographic device, such as a video camera)

After the computer is powered on to start Windows 95 by pressing the operation key, a video capture utility is run to perform a photographic operation, thereby storing image data in the HDD.

(4) Scheduler Startup Utility (Opening This Week's Page)

After the computer is powered on to start Windows 95 by pressing the operation key, a schedule software program is run to open the "this week's schedule page" (which is convenient for a schedule software program that automatically opens the "today's schedule page" upon running the program).

(5) Digital Still Camera (DSC) Interlock Utility

The DSC is powered on and is placed in proximity with the computer in which the infrared data (IRDA) communication utility has been set. After the computer is powered on to start Windows 95 by pressing the operation key, a communication software program is run to connect the computer with the digital still camera, thereby incorporating image data stored in the digital still camera into the HDD.

(6) PHS Utility (Application where the computer is combined with a PHS communication card)

After the computer is powered on to start Windows 95 by pressing the operation key, a Personal Handy-phone System (PHS) dialer software program is run to input a desired telephone number, thereby making it possible to make a telephone call.

(7) Multi-Computer Synchronizing and Powering on Utility (Data Exchange Utility With Other Computers)

(Application where both cable connection utility and Briefcase utility of Windows 95 are used)

Two computers are interconnected with a parallel cable and are powered on to start Windows 95 by pressing the respective operation keys. After the computers are connected with a cable connection utility, a file in a specified folder is updated from the latest file to the older file by checking the time stamp.

(8) IrDA Synchronizing Utility (Data Exchange Utility With Other Computer)

(Application where a cable connection utility, Briefcase utility, and an IrDA communication utility of Windows 95 are used)

Two personal computers (PCs) are placed in such a manner that both IrDA transmitting and receiving units face each other. After the computers are powered on to start Windows 95 by pressing the operation keys, the two PCs are IrDA-connected and connected with a cable connection utility. Then, a file in a specified folder is updated from the latest file to the older file by checking the time stamp.

(9) Panic Utility

By pressing the operation key, a screen different from a currently displayed screen is shown. For example, an image of "a screenshot in calculating costs while running a spreadsheet software program" is shown.

(10) Security Utility:

By pressing the operation key and setting a password, a computer terminal is locked and protected from unauthorized users on occasions, such as while the authorized user is away. The authorized user (who has started a password screensaver by pressing one of the keys of the keyboard) unlocks the guard by inputting a registered password.

(11) Internet Utility

After the computer is powered on to start Windows 95 by pressing the operation key, dial-up connection is established with PPP and a World Wide Web (WWW) browser boots up. A specified Uniform Resource Locator (URL) page is then displayed.

(12) Display Demonstration Utility (Application where the computer is on display in a retailer)

After the computer is powered on to start Windows 95 by pressing the operation key, a display demonstration software program is run to show the features and advantages of the product.

(13) Ink Word Processor Utility

After the computer is powered on to start Windows 95 by pressing the operation key, ink word processor software is run, and a tablet is switched to an absolute value mode, thereby making it possible to immediately perform an input operation with a pen.

(14) Handwriting Recognition Utility (For a computer in which input is normally performed through a keyboard)

By pressing the operation key, character recognition software is run, and a tablet is switched to an absolute value mode, thereby making it possible to input handwritten characters.

(15) Fax Note Utility

After the computer is powered on to start Windows 95 by pressing the operation key, facsimile (FAX) software is run to fax text or illustrations input through a keyboard or by handwriting.

(16) Silent Utility

By pressing the operation key, the computer is powered on to start Windows 95 by turning off the sound utility. The silent utility is used on occasions where playing sound may disturb other people in, for example, a meeting or a conference. The timer may be used instead of the operation key, to effect the same function.

The present invention is not limited to the foregoing embodiment.

Although in the foregoing embodiment a portable computer is used as an electronic machine, other types of electronic machines may be used. For example, a portable information terminal or personal digital assistants (PDA), a cellular telephone, or a radio transmitter may be employed.

In the foregoing embodiment, the message lamp ML is used to inform the status of e-mail software which has been run by pressing the operation key 41. In place of the message lamp ML, other functions may be used as the reporting means. For example, a sound signal may be transmitted to the speaker 60B shown in FIG. 4 to issue sound. A liquid crystal display device 3A of the display unit 3 is backlit by a backlight 3B, and the information concerning the presence or the absence of e-mail may be displayed on the liquid crystal display device 3A.

As is seen from the foregoing description, the present invention offers the following advantage. A specific function of an application program, such as an incoming e-mail retrieving function, installed in an electronic machine, can be automatically started with a user's single touch operation.

What is claimed is:

1. A program startup apparatus for use in an electronic machine and for automatically starting up a predetermined application program stored in said electronic machine, said program startup apparatus comprising:

operation means for receiving user input;

startup condition storage means for storing an assigned condition of said operation means as a preset startup condition for said predetermined application program; and startup sequence control means for starting up said predetermined application program upon a determination that said operation means is in said assigned condition stored in said startup condition storage means, wherein said startup sequence control means starts up a basic program for controlling said electronic machine upon a determination that said operation means is in said assigned condition and that said basic program is not running, and then starts up said predetermined application program, and wherein said startup sequence control means starts up said electronic machine upon a determination that said operation means is in said assigned condition and that said electronic machine is not running, then starts up said basic program, and then starts up said predetermined application program.

2. The program startup apparatus according to claim 1, wherein said operation means is provided on an exterior portion of said electronic machine when said electronic machine is in a closed state.

3. The program startup apparatus according to claim 1, wherein said operation means is provided independently of a power switch for providing power to the electronic machine.

4. The program startup apparatus according to claim 1, further comprising a real time clock for counting time, wherein a preset startup time is stored in said startup condition storage means as the startup condition, and said startup sequence control means starts up said predetermined application program upon a determination that the time counted by said real time clock matches the preset startup time stored in said startup condition storage means.

5. The program startup apparatus according to claim 1, wherein said startup sequence control means starts up a predetermined function of said predetermined application program upon a determination that said operation means is in said assigned condition stored in said startup condition storage means.

6. The program startup apparatus according to claim 5, wherein said predetermined application program comprises an electronic mail program for sending and receiving mail via a network, and said predetermined function comprises retrieving mail addressed to a user.

7. The program startup apparatus according to claim 6, further comprising reporting means for reporting that mail addressed to the user has been retrieved.

8. The program startup apparatus according to claim 7, wherein said reporting means comprises an indicator provided on an exterior portion of said electronic machine when a display unit of said electronic machine is in a closed state.

9. An electronic machine that automatically starts up a predetermined application program stored therein, comprising:

operation means for receiving user input;

startup condition storage means for storing an assigned condition of said operation means as a preset startup condition for said predetermined application program; and startup sequence control means responsive to said startup condition storage means for starting up said predetermined application program upon a determination that said operation means is in said assigned condition stored in said startup condition storage means, wherein said startup sequence control means starts up a basic program for controlling said electronic machine upon a determination that said operation means is in said assigned condition and that said basic program is not running, and then starts up said predetermined application program, and wherein said startup sequence control means starts up said electronic machine upon a determination that said operation means is in said assigned condition and that said electronic machine is not running, then starts up said basic program, and then starts up said predetermined application program.

10. A program startup method for use in an electronic machine having operation means for receiving user input, and for automatically starting up a predetermined application program stored in said electronic machine, said program startup method comprising the steps of:

storing an assigned condition of said operation means as a preset startup condition for said predetermined application program;

determining whether said operation means is in said assigned condition; and starting up said predetermined application program if said operation means is in said assigned condition, wherein, if said operation means is in said assigned condition in a state in which a basic program for controlling said electronic machine is not running, said step of starting up further includes starting up said basic program before starting up said predetermined application program, and wherein, if said operation means is in said assigned condition in a state in which said electronic machine is not running, said step of starting up further includes starting up said electronic machine and starting up said basic program before starting up said predetermined application program.

11. The program startup method according to claim 10, wherein said step of starting up further starts up a predetermined function of said predetermined application program.

12. The program startup method according to claim 11, wherein said predetermined application program comprises an electronic mail program for sending and receiving mail via a network, and said predetermined function comprises retrieving mail addressed to a user.

13. The program startup method according to claim 12, further comprising the step of indicating that mail addressed to the user has been retrieved.

14. A medium for storing a startup program for automatically starting up a predetermined application program stored in an electronic machine having operation means for receiving user input, said startup program comprising the steps of:

determining whether said operation means is in an assigned condition; and starting up said predetermined application program if said operation means is in said assigned condition, wherein, if said operation means is in said assigned condition in a state in which a basic program for controlling said electronic machine is not running, said step of starting up further includes starting up said basic program before starting up said predetermined application program, and wherein, if said operation means is in said assigned condition in a state in which said electronic machine is not running, said step of starting up further includes starting up said electronic machine and starting up said basic program before starting up said predetermined application program.

15. The storage medium according to claim 14, wherein said startup program further starts a predetermined function of said predetermined application program.

16. The storage medium according to claim 15, wherein said predetermined application program comprises an electronic mail program for sending and receiving mail via a network, and said predetermined function comprises retrieving mail addressed to the user.

17. The storage medium according to claim 16, wherein information indicating that mail addressed to the user has been retrieved is reported by said program startup.

* * * * *